Jan. 16, 1940.  F. H. FIELD  2,187,419
VEHICLE DELIVERY BODY
Filed Jan. 29, 1938  2 Sheets-Sheet 2
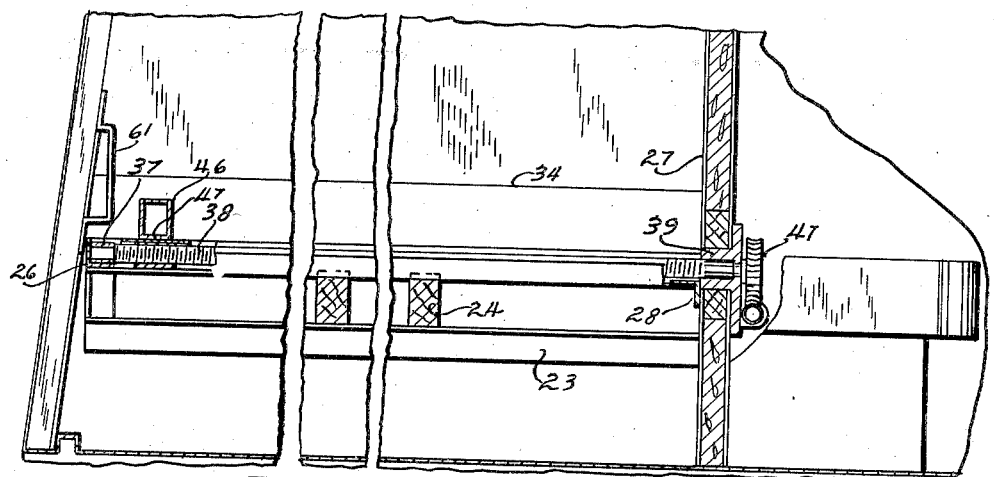
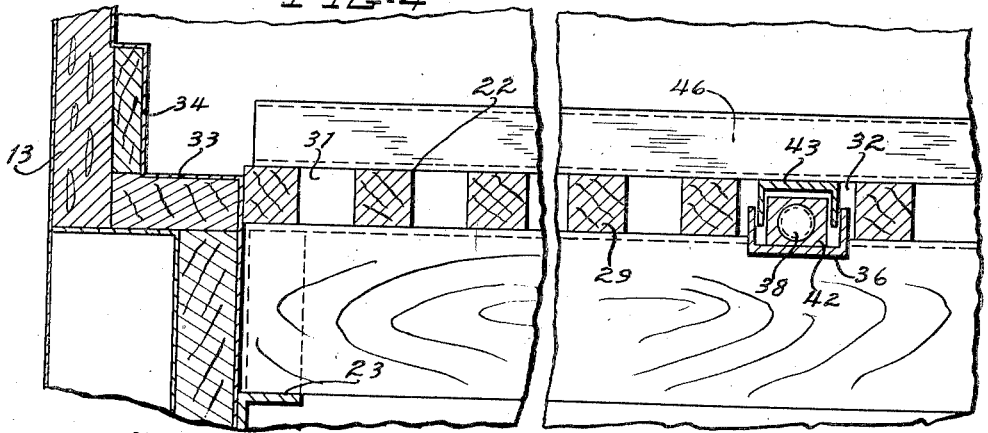
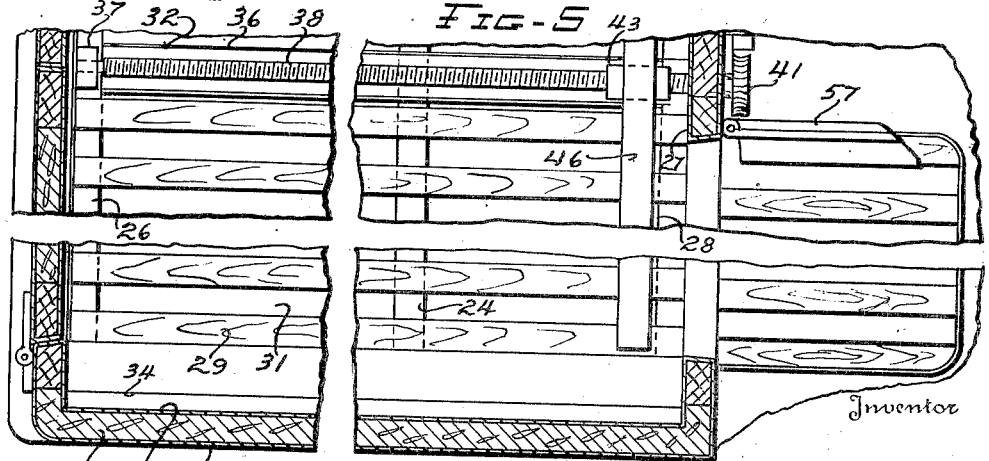
Inventor
Frank H. Field
By
Richmond L. Hayes
Attorney Patented Jan. 16, 1940

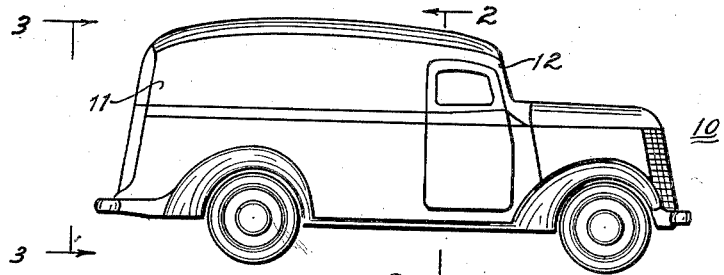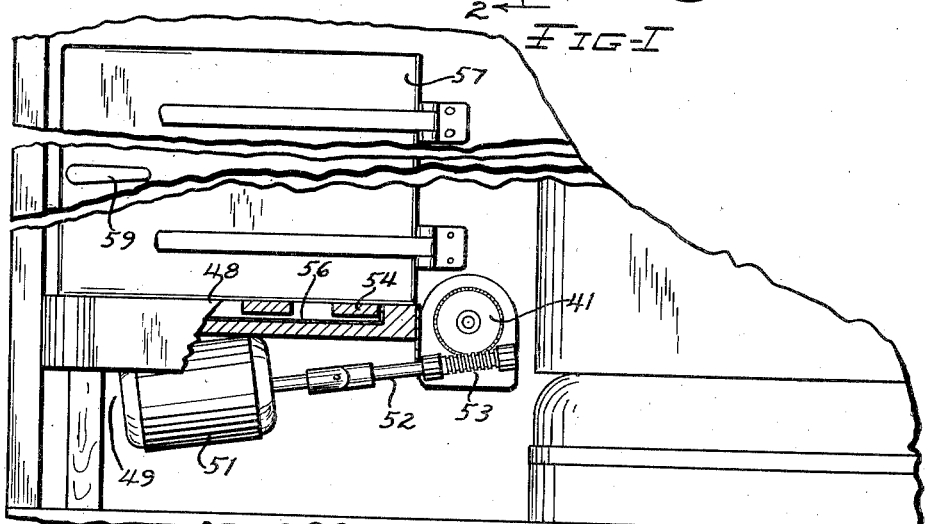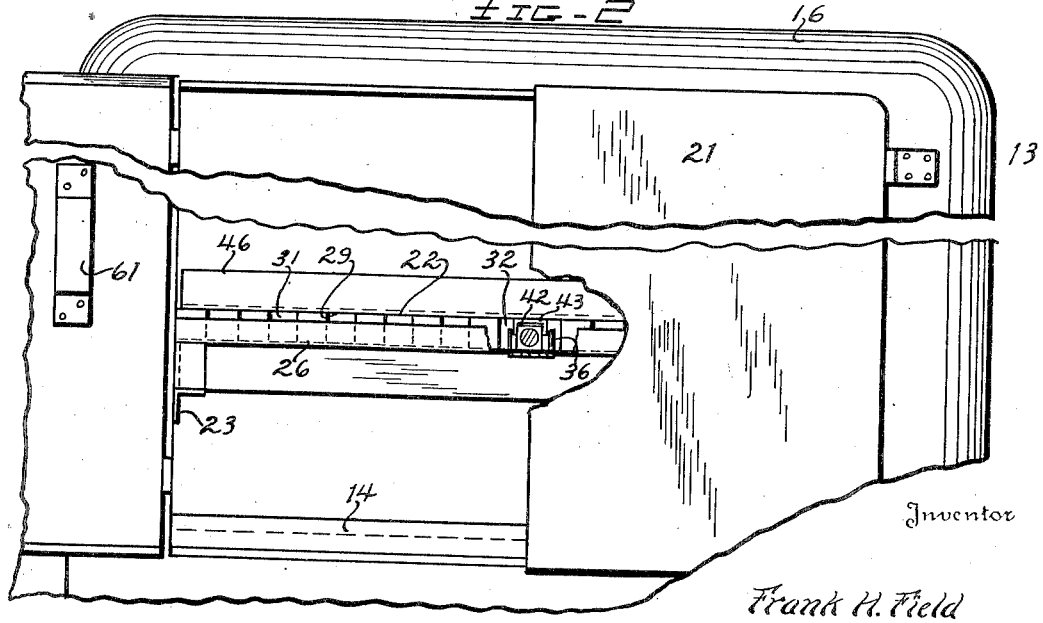

2,187,419

UNITED STATES PATENT OFFICE 2,187,419

VEHICLE DELIVERY BODY

Frank H. Field, Jamestown, N. Y.

Application January 29, 1938, Serial No. 187,716

7 Claims. (Cl. 214—82)

This invention relates to an improvement in a vehicle delivery body and more particularly to one for use in connection with the transportation and distribution of package merchandise.

The invention as shown in the drawings is embodied in a delivery body for use in conveying and distributing ice but it is obvious that there are many other uses for a structure of this nature and, therefore, applicant is not to be limited thereto since the specific disclosure is for purposes of illustration only. In one form, the invention discloses a closed delivery body preferably provided with a suitable heat insulating material in the walls thereof. On the floor of the body is located a mechanism by which package or piece merchandise is adjusted and prevented from sliding about during transportation regardless of whether the body is completely or only partially filled.

It is well known that considerable time is wasted in loading a vehicle with merchandise and making door to door delivery thereof and it is the purpose of the present invention to provide a vehicle body which facilitates loading and delivering, protects the merchandise against breakage during transit and preserves the merchandise against loss due to extreme temperatures if the merchandise is of this nature. These features, as well as others more fully understood from a consideration of the following specification, constitute the objects and advantages of the invention.

Fig. 1 is a side elevation of a vehicle embodying one form of the invention;

Fig. 2 is an enlarged fragmentary transverse vertical sectional view of a portion of the vehicle body, being taken substantially on the line 2—2 of Figure 1;

Fig. 3 is an enlarged rear elevation of the vehicle body, one door being opened and other parts broken away to disclose details of structure;

Fig. 4 is a vertical longitudinal sectional view of a part of the body, showing a mechanism for adjusting and securing merchandise;

Fig. 5 is a transverse vertical sectional view of a part of the floor and adjusting mechanism; and Fig. 6 is a plan view of a part of the floor and delivery platform of the vehicle.

It is well known to manufacturers and distributers of perishable as well as frangible merchandise such for example, as ice, frozen products, etc., that loading a delivery vehicle and delivering the contents thereof must ordinarily be accomplished with all possible haste if the merchandise is to be preserved in its proper condition and neither broken nor spoiled. Because of this condition, distributers have frequently resorted to small vehicles which, having great mobility, could be issued to deliver merchandise in a sufficiently short time to prevent spoilage, shrinkage, or breakage. However, in the case of merchandise such as ice, it is not economical to make small quantity deliveries and yet merchandise of this nature is highly susceptible to both shrinkage and breakage. The vehicle body of the present invention in actual use has greatly reduced losses sustained in the distribution of ice by making it possible to cut the ice at substantially the prescribed weight without additional weight allowance for anticipated shrinkage or breakage losses. For example, in some instances and particularly in rural districts several hours may pass before full distribution of one load can be made. In an open vehicle shrinkage is very rapid and the last consumer would receive underweight cakes of ice were it not for the fact that the manufacturers and distributers have allowed for this shrinkage when cutting the ice cakes. By providing the vehicle body with a device which prevents the ice from sliding about and becoming broken as well as enclosing and insulating the body, it is possible for the manufacturer and distributer to effect a considerable saving.

Referring to the drawings, one form of the invention is shown applied to a vehicle, generally indicated by the reference numeral 10. Mounted on the vehicle chassis is a closed body 11 of any conventional design which may include a cab portion 12. The side walls 13, bottom wall 14 and top wall 16 are of conventional construction and in one form may include spaced apart outer and inner walls 17 and 18 between which a suitable heat insulating filler 19 is located. The rear of the vehicle is provided with a pair of side hinged doors 21 which, when opened, expose the entire rear end of the floor 22 of the body.

Secured to the side walls 13 are angle plates 23. As shown in Figures 3 and 4 of the drawings, these plates are adapted to mount one or more transverse floor supports 24 and a rear bar 26. The front wall 27 of the body has an angle plate 28 secured thereto. The floor 22 consists of planks 29 extending longitudinally of the body and mounted on supports 24, bar 26, and angle plate 28. These planks may be spaced apart to provide vertical grooves 31. Centrally of the floor is a groove 32, the purpose of which will hereinafter be set forth. In the particular type of vehicle body illustrated, it will be noted the floor 22 is spaced somewhat above the bottom wall 14 and that there is a ledge 33 between the side walls 13 and the flooring. This ledge is relatively narrow and serves no special purpose. The upper surface of the flooring is slightly above the ledge 33 and wall protectors or spacers 34 are provided for the purpose of preventing merchandise from damaging the interior surfaces of walls 13.

Within the space 32 is located an upwardly opening channel member 36. This member extends the full length of the floor 22 and at the rear end thereof secures a bearing 37. The channel member 36 is also mounted on the angle plate 28 and supports 24. Within the channel member is a threaded shaft 38. One end of this shaft projects into the bearing 37 and the other end through a further bearing 39 in the forward wall 27. The portion of the shaft projecting beyond the wall 27 is fitted with a gear 41.

A block 42, having a threaded opening, is mounted on shaft 38 and adapted to rest on the base wall of the channel member 36. A short channel member 43 is inverted and mounted on the block 42. The ends of this channel member are provided with pins or lugs 44 which overlie the ends of the block and cause the channel member to move with the block when the shaft is rotated. A merchandise adjusting bar is arranged transversely of the floor 22 and in one form may consist of an inverted channel member 46 having horizontal flanges 47 secured, in any suitable manner as by welding, to the base wall of the inverted channel member 43. The member 46 may extend substantially the full width of the floor and serves, when moved forwardly or rearwardly of the body, to advance merchandise toward one or the other end thereof. It will be noted that due to the type of engagement of channel member 43 with the block 42, the adjusting bar may be readily removed for the purpose of loading the body.

That portion of the vehicle body designated as the cab 12 includes a floor which is a continuation of the bottom wall 14. A part of the floor space in the cab is occupied by a driver's seat and the remainder thereof provided with a raised platform 48 which is on a level with and substantially a continuation of the floor 22. This platform provides a compartment 49 therebeneath in which may be located a motor 51. A flexible shaft 52 connects the motor with a worm gear 53 that is in turn engaged with the gear 41. Inasmuch as the motor 51 is reversible, it serves to rotate shaft 38 in either direction, thus moving block 42 and bar 46 forwardly or rearwardly of the floor 22. Although a motor is shown as the means for rotating shaft 38, it will be understood that this shaft may be rotated by a hand crank through a reduction gear unit or a suitable transmission may be connected with the drive of the vehicle motor. The platform 48 may be formed with slats 54 and a drain shelf 56 provided by which to prevent water from melting ice or rain coming in contact with the motor 51.

Adjacent the platform 48, the front wall 27 of the body is formed with an opening in which is fitted a door 57. The door is mounted on suitable hinges 58 located adjacent the vertical center of the front wall and thus swings open in a direction to give ready access to the removal of ice or other merchandise from the interior of the body onto the platform 48. A suitable latch 59 serves to secure the door 57 in closed position.

The rear of the vehicle body illustrated is closed by a pair of doors 21. The closed position of these doors is on a forward incline in order that they may conform to the general contour of the body. Secured to the inner face of each door is a plate 61 which projects inwardly of the body to a position adjacent the rear vertical edge of the flooring 22 in order that ice or other merchandise may be supported in upright position by the doors.

When it is desired to use a vehicle having a body constructed in accordance with the present invention the rear doors 21 are opened preparatory to filling the body with ice or other merchandise. If it is contemplated to unload from the forward end of the vehicle, the bar 46 is lifted from off the floor 22 and cakes of ice placed on the floor and slid forwardly until the body is substantially filled. The bar 46 is then replaced, being engaged through channel 43 with block 42. When the motor 51 is started shaft 38 rotates and causes bar 46 to move forwardly of the body until the cakes of ice are well packed against the front wall 27. The doors 21 are then closed and the vehicle is ready for use. When it is desired to unload a part of the contents of the body, door 57 is unlatched and opened, and a cake of ice drawn out onto the platform 48. After two or three deliveries of this nature, the driver again starts motor 51 causing the bar 46 to again move forwardly and secure the cakes of ice between it and the front wall 27. It is obvious that the motor 51 may be so arranged as to shut off automatically when a predetermined pressure of the bar 46 is exerted on the cakes of ice, and thus the driver of the vehicle may be making a delivery while the motor is operating to secure the remaining cakes of ice. It may readily be understood that by keeping the ice cakes close together there is little or no possibility of their becoming chipped or broken. Furthermore, ice in cake form tends to melt less rapidly if the cakes are close together than when they are separated. The bar 46 not only functions to prevent movement of the ice cakes during transit, but may also act as a means of feeding ice to the door opening preparatory to the ice being withdrawn onto the delivery platform 48.

Not infrequently it occurs that an ice distributer may be required to deliver ice in quantities greater than that normally required for domestic use, and the vehicle body above described is adapted for this purpose. Under these circumstances it is found expedient to load and unload at the rear. The bar 46 is therefore moved forwardly of the vehicle body until it approaches the front wall 27. The body is then loaded and doors 21 closed and latched. Inasmuch as these doors are of rugged construction, it is practicable to run the motor 51 and move bar 46 rearwardly to cause the cakes of ice to contact plates 61 of the doors 21. When it is desired to withdraw ice from the vehicle, the doors 21 are opened and motor 51 may be started. As the cakes are moved rearwardly over the floor 22, they may be withdrawn onto a platform, conveyance, or other space prepared, consecutively, one after the other, until the entire body has been emptied. In practice it has been found that a considerable amount of time is saved in delivering ice in quantities through the use of a vehicle body equipped as described.

Although applicant has shown and described only one modification of an invention which includes means for feeding merchandise in package or piece form and means for moving this merchandise from one to another end of a vehicle body, and this means is also adapted to secure the merchandise against movement or displacement within the vehicle during transit, it will be understood by those skilled in the art that other modifications or adaptations are contemplated in so far as they are within the spirit and scope of the invention as defined in the hereunto annexed claims.

Having thus set forth my invention what I claim as new and for which I desire protection by Letters Patent is:

1. In a vehicle body for transporting package merchandise having a floor, means beneath the surface of said floor movable longitudinally of said body, and further means adapted to be mounted on said floor and in engagement with said means subsequent to the loading of said vehicle with said merchandise, said further means being movable by said means to adjust and secure said merchandise in engagement with one or the other end walls of said body.

2. In a vehicle body for transporting package merchandise having upright enclosing walls and a floor on which merchandise is located, means beneath the level of said floor, said means being movable longitudinally of said body, a merchandise adjusting bar adapted to be mounted on said floor transversely of said body and being engageable and movable with said means, said bar serving to move merchandise along said floor into engagement with one or the other end enclosing walls of said body and secure said merchandise against displacement during transportation thereof.

3. In a vehicle body for transporting package merchandise having a floor and upstanding walls, a merchandise adjusting and securing device comprising means located beneath the floor surface on which merchandise is to be located, motor actuated means for moving said means along said floor from one end to the other, an adjusting bar mounted on said floor transversely of said body and engageable and movable with said means, said bar being adapted to contact and move merchandise along said floor into engagement with one or the other end walls of said body and prevent displacement thereof during transit.

4. In a vehicle body for transporting package merchandise having suitable upright walls and floor, a merchandise adjusting and securing device comprising means recessed into said floor out of merchandise contact, said means being motor actuated to move from one to the other ends of said body, an adjusting bar adapted to be mounted on said floor subsequent to the loading of said vehicle with merchandise, said bar being engaged by and movable with said means to compact and move said merchandise along said floor into engagement with one of the end walls of said body and so retain said merchandise during transit.

5. In a vehicle body for transporting frangible merchandise having upright enclosing walls and floor, said floor having an upwardly opening recess or groove extending substantially the length thereof, a merchandise adjusting and securing device comprising a block located in said recess, said block being beneath the surface of said floor to avoid contact with merchandise, means for moving said block toward one or the other ends of said recess, and an adjusting bar, said bar being engaged with said block, and movable to contact and move merchandise along said floor into abutment with one of the end walls of said body and so retain said merchandise during transit.

6. In a closed vehicle body for transporting package merchandise having a floor and upright walls joined thereto, said floor being centrally recessed to provide a longitudinally extending groove, a merchandise adjusting and securing device comprising a block located in said groove, said block being beneath the surface of and out of contact with merchandise on said floor, motor actuated means engaged with and adapted to cause said block to move along said groove toward one or the other ends of said floor, and an adjusting bar arranged transversely of said floor and engaged with said block, said bar being adapted to be moved along said floor to move and compact the merchandise in said body adjacent one or the other end walls.

7. In a closed vehicle body having a floor and upright walls joined thereto and adapted to transport package merchandise, said floor being recessed to provide a longitudinally extending groove, a merchandise adjusting and securing device comprising a threaded shaft located in said groove, a block on said shaft located beneath the plane of said floor, means for rotating said shaft to advance said block toward one or the other ends of said floor, and an adjusting bar arranged transversely of said floor, said bar being engageable with said block and movable to contact and secure merchandise against displacement during transit.

FRANK H. FIELD.